US007536194B2

(12) United States Patent
Manjeshwar et al.

(10) Patent No.: US 7,536,194 B2
(45) Date of Patent: May 19, 2009

(54) METHOD AND SYSTEM FOR PROVIDING AN ENERGY EFFICIENT EXCHANGE OF INFORMATION IN WIRELESS NETWORKS

(75) Inventors: Arati Manjeshwar, Chandler, AZ (US); Lakshmi Venkatraman, Mountain View, CA (US); Bhaskar Srinivasan, Menlo Park, CA (US)

(73) Assignee: Robert Bosch GmbH, Stuttgart (DE)

( * ) Notice: Subject to any disclaimer, the term of this patent is extended or adjusted under 35 U.S.C. 154(b) by 659 days.

(21) Appl. No.: 11/239,837

(22) Filed: Sep. 30, 2005

(65) Prior Publication Data

US 2007/0077951 A1 Apr. 5, 2007

(51) Int. Cl.
*H04B 7/00* (2006.01)

(52) U.S. Cl. ........................ 455/515; 455/418; 370/503; 370/507; 370/509; 370/512; 370/514; 370/520; 370/525; 340/825.2; 340/825.21; 375/356

(58) Field of Classification Search ................. 370/503, 370/507, 509, 512, 514, 520, 525; 340/825.2, 340/525.21; 375/356
See application file for complete search history.

(56) References Cited

U.S. PATENT DOCUMENTS 5,353,341 A * 10/1994 Gillis et al. ................. 455/464
6,034,603 A 3/2000 Steeves
6,603,979 B1 * 8/2003 Hirsch ......................... 455/502
2003/0198212 A1 * 10/2003 Hoctor et al. ............... 370/350
2004/0042498 A1 * 3/2004 Furuness et al. ............ 370/503
2005/0122231 A1 6/2005 Varaiya et al.

FOREIGN PATENT DOCUMENTS

DE 199 41 580 3/2001
EP 0 600 374 11/1993
WO WO 01/26069 4/2001

OTHER PUBLICATIONS

European Search Report, Dec. 20, 2007, European Patent Application EP06020059.

* cited by examiner

*Primary Examiner*—Alexander Eisen
*Assistant Examiner*—Justin Y Lee
(74) *Attorney, Agent, or Firm*—Kenyon & Kneyon LLP

(57) ABSTRACT

A method and system to synchronize a first device and a second device includes generating a first tone by the first device, the first tone one of including an identity of the second device and generated at a predefined time, receiving the first tone by the second device, setting a clock of the second device based on the received first time, and sending an acknowledgment by the second device to the first device.

15 Claims, 2 Drawing Sheets

METHOD AND SYSTEM FOR PROVIDING AN ENERGY EFFICIENT EXCHANGE OF INFORMATION IN WIRELESS NETWORKS

CROSS REFERENCE TO RELATED APPLICATIONS

This application is related to U.S. patent applications entitled "Method and System for Time Synchronization in Communication Networks" Ser. No. 11/241,298, "Method and System for Providing Acknowledged Broadcast and Multicast Communication" Ser. No. 11/240,401, "Method and System for Providing Interference Avoidance and Network Coexistence in Wireless Systems" Ser. No. 11/240,545, "Method and System for Reliable Data Transmission in Wireless Networks" Ser. No. 11/239,836, "Method and System to Reduce Delay and/or Energy Consumption in a Multi-Hop Wireless System" Ser. No. 11/240,436, "Method and System for Providing a Modified Time Division Multiple Access (TDMA) for Reduced Delay" Ser. No. 11/241,639, "Method and System for Providing Reliable Communication with Redundancy for Energy Constrained Wireless Systems" Ser. No. 11/241,300, "System and Method for a Communication Protocol for Wireless Sensor Systems Including Systems with High Priority Asynchronous Message and Low Priority Synchronous Message" Ser. No. 11/241,296, "Method and System to Reconfigure a Network to Improve Network Lifetime Using Most Reliable Communication Links" Ser. No. 11/240,434. The disclosure of each of the foregoing related applications is hereby incorporated by reference herein in its entirety.

FIELD OF THE INVENTION

The present invention relates to an energy efficient exchange of information between wireless devices of a communication network.

BACKGROUND INFORMATION

Energy-constrained wireless communication systems, such as, for example, battery operated wireless sensor networks, may conserve energy by attempting to keep whenever possible the transceiver in the lowest power mode (e.g., sleep mode). However, in certain wireless communication systems that require low latency for high priority data transfer, it may be important that the links and devices be supervised to better ensure they are operational and usable. This may not only be a regulatory requirement in some systems but also a requirement of the communication protocol.

Wireless sensor networks may be classified into three types of systems based on the type of packet exchange: periodic, reactive or hybrid. Many or most sensor systems are hybrid systems requiring very low latency for high priority data (e.g., alarms in the system), periodic supervision of the error-free operation of the sensors, and a reliable communication link between the sensor and the user. The hybrid systems may include, for example, systems that conform to the Adaptive sensitive Threshold Energy Efficient sensor Network (APTEEN) protocol.

Certain wireless communication systems may supervise links and/or devices by uni-casting complete packets (e.g., a poll) and waiting for an acknowledgement. In this regard, the receiver of the unicasted packets may synchronize to the transmitter and send an acknowledgement that contains the status of the device, as discussed, for example, in German Published Patent No. 199 41 580. If, for example, the transmitter does not receive the acknowledgement, the transmitter may retransmit the packet a pre-defined number of times. If, however, the transmitter receives the acknowledgement, it does not poll the receiver again. To receive the poll packets, the receiver may wake up in every time slot (assigned to it) to check for the poll until a timeout occurs, after which the receiver goes back to sleep. The receiver may also wake up in the next time slot assigned to it and check for a poll, and if it does not receive a poll it may assume the transmitter received the acknowledgement and returns to sleep. This approach, however, may not be suitable for a lossy channel, and may be inefficient in terms of energy and time since complete packets are exchanged without extra information.

SUMMARY OF THE INVENTION

An exemplary embodiment and/or exemplary method of the present invention may provide an energy and time efficient exchange of information between any two or more devices using short pulses or tones instead of packets, which may be, for example, used to supervise the devices and their connectivity status, or to synchronize the devices.

According to an exemplary embodiment and/or exemplary method of the present invention, the sender may transmit a short pulse (e.g., poll tone) at a predefined time, which may include the receiver's identity, and the receiver may respond with an acknowledgement. In turn, the sender of the short pulse or poll tone may respond to the acknowledgement from the receiver with another acknowledgement (e.g., ack-to-ack tone) so that the receiver may go back to sleep (which may be most efficient, for example, when the receiver is power constrained). In this regard, the transmission of the poll/ack-to-ack tone may indicate either that the sender of the short pulse or poll tone received the acknowledgement, or that the sending of the short pulse or poll tone is again requesting an acknowledgement. In this regard, a single bit may be, for example, used to distinguish the two.

According to an exemplary embodiment and/or exemplary method of the present invention, a short pulse, such as, for example, a tone may be transmitted instead of poll packets, and a single bit may be used to differentiate a poll/ack-to-ack tone. In particular, instead of sending poll packets, the sender may transmit a poll tone, which contains a sequence of bytes required by the receiver to synchronize itself to the sender, followed by a node identifier (if required by the application) and an indication that the receiver is being polled. In this regard, single bit errors may be corrected by using suitable coding and multi-bit error may be detected by byte mismatch. The receiver may acknowledge the reception of the packet and if the receiver has additional information, which is only to be sent infrequently (e.g., battery level, noise level at the receiver, etc.), it may also indicate this in the acknowledgement by setting a particular bit. When the receiver receives the ack-to-ack tone it may transmit the packet containing the additional information. Hence, by separating the additional information (which may need to be transmitted less frequently) from the poll acknowledgement, the assigned time slots may be kept smaller, thus accommodating more time slots in a given time frame.

The European Telecommunication Standards Institute (ETSI) promulgates certain standards that limit the transmission duty cycle to 0.1% and channel bandwidth to 25 KHz for the security frequency band at 868 MHz. The low bandwidth increases the time needed to transmit a packet thus making the time slots longer. The low duty cycle (0.1%) limits the transmission time in a given interval thus limiting the number of nodes a transmitter can communicate with.

An exemplary embodiment and/or exemplary method present invention may allow communication with an increased number of network nodes, and may reduce the length of the time slots and/or energy consumption, while meeting the regulatory requirements.

An exemplary embodiment and/or exemplary method of the present invention is directed to a method of synchronizing a first device and a second device, which includes generating a first tone by the first device, the first tone one of including an identity of the second device and generated at a predefined time, receiving the first tone by the second device, setting a clock of the second device based on the received first time, and sending an acknowledgment by the second device to the first device.

Another exemplary embodiment and/or exemplary method of the present invention is directed to a method of synchronizing a first device and a second device, which includes (i) waiting for a predefined period of time by the second device for an indication of acknowledged receipt of the acknowledgement and (ii) waking up in a subsequent supervision time slot to receive the indication of acknowledged receipt of the acknowledgement if the indication is not received within the predefined period of time.

Yet another exemplary embodiment and/or exemplary method of the present invention is directed to a method of synchronizing a first device and a second device, which includes repeating steps (i) and (ii) for a predefined number of times, and transmitting a poll by the second device to the first device if the indication of acknowledged receipt is not received.

Still another exemplary embodiment and/or exemplary method of the present invention is directed to a method of synchronizing a first device and a second device, which includes generating a second tone by the first device to acknowledge receipt of the acknowledgement, receiving the second tone by the second device, and entering into sleep mode by the second device.

Yet another exemplary embodiment and/or exemplary method of the present invention is directed to a method of synchronizing a first device and a second device, in which the first tone and the second tone are distinguishable via a single bit.

Still another exemplary embodiment and/or exemplary method of the present invention is directed to a method of exchanging information between at least two wireless communication devices, which includes transmitting a tone between the at least two wireless communication devices.

Yet another exemplary embodiment and/or exemplary method of the present invention is directed to a method of exchanging information between at least two wireless communication devices, in which the tone is used to synchronize at least one of the at least two communication devices.

Still another exemplary embodiment and/or exemplary method of the present invention is directed to a method of exchanging information between at least two wireless communication devices, in which the tone is used to ensure a connectivity status between at least two of the at least two communication devices.

Yet another exemplary embodiment and/or exemplary method of the present invention is directed to a method of exchanging information between at least two wireless communication devices, in which the tone is used to supervise at least one of the at least two communication devices.

Still another exemplary embodiment and/or exemplary method of the present invention is directed to a method of exchanging information between at least two wireless communication devices, in which the tone includes a short pulse.

Yet another exemplary embodiment and/or exemplary method of the present invention is directed to a method of exchanging information between at least two wireless communication devices, in which the tone includes an indication of an identity of one of the at least two communication devices.

Still another exemplary embodiment and/or exemplary method of the present invention is directed to a method of exchanging information between at least two wireless communication devices, in which at least one of the at least two communication devices are wireless communication devices.

Yet another exemplary embodiment and/or exemplary method of the present invention is directed to a method of exchanging information between at least two wireless communication devices, in which at least one of the at least two communication devices are an energy-constrained device.

Still another exemplary embodiment and/or exemplary of the present invention is directed to a method of energy efficient exchange of information in a wireless network, which includes transmitting a tone to a node element of the wireless network, the tone including at least one of an identity of the node element and generated at a predefined time known to the node element, and receiving the tone by the node element.

Yet another exemplary embodiment and/or exemplary method of the present invention is directed to a method of exchanging information between at least two wireless communication devices, in which the tone is transmitting in a predefined time slot allocated for supervision of the wireless network.

Still another exemplary embodiment and/or exemplary method of the present invention is directed to a method of exchanging information between at least two wireless communication devices, which includes waking up in the predefined time slot to receive the tone.

Yet another exemplary embodiment and/or exemplary method of the present invention is directed to a method of exchanging information between at least two wireless communication devices, which includes setting a clock of the node element based on the predefined time known to the node element.

Still another exemplary embodiment and/or exemplary method of the present invention is directed to a method of exchanging information between at least two wireless communication devices, which includes transmitting an acknowledgment of receipt of the tone.

Yet another exemplary embodiment and/or exemplary method of the present invention is directed to a method of exchanging information between at least two wireless communication devices, which includes transmitting a tone by the node element if an acknowledgement to the acknowledgement of the receipt of the tone is not received, or entering a sleep mode by the node element if the acknowledgement to the acknowledgement of the receipt of the tone is received.

An exemplary embodiment and/or exemplary method of the present invention is directed to a method of exchanging information between at least two wireless communication devices, which includes transmitting another tone in a default frequency of the wireless network if a predefined supervision interval expires and one of the acknowledgement of the receipt of the tone has not been received and the tone transmitted by the node element is not received.

DETAILED DESCRIPTION

Figure 1:
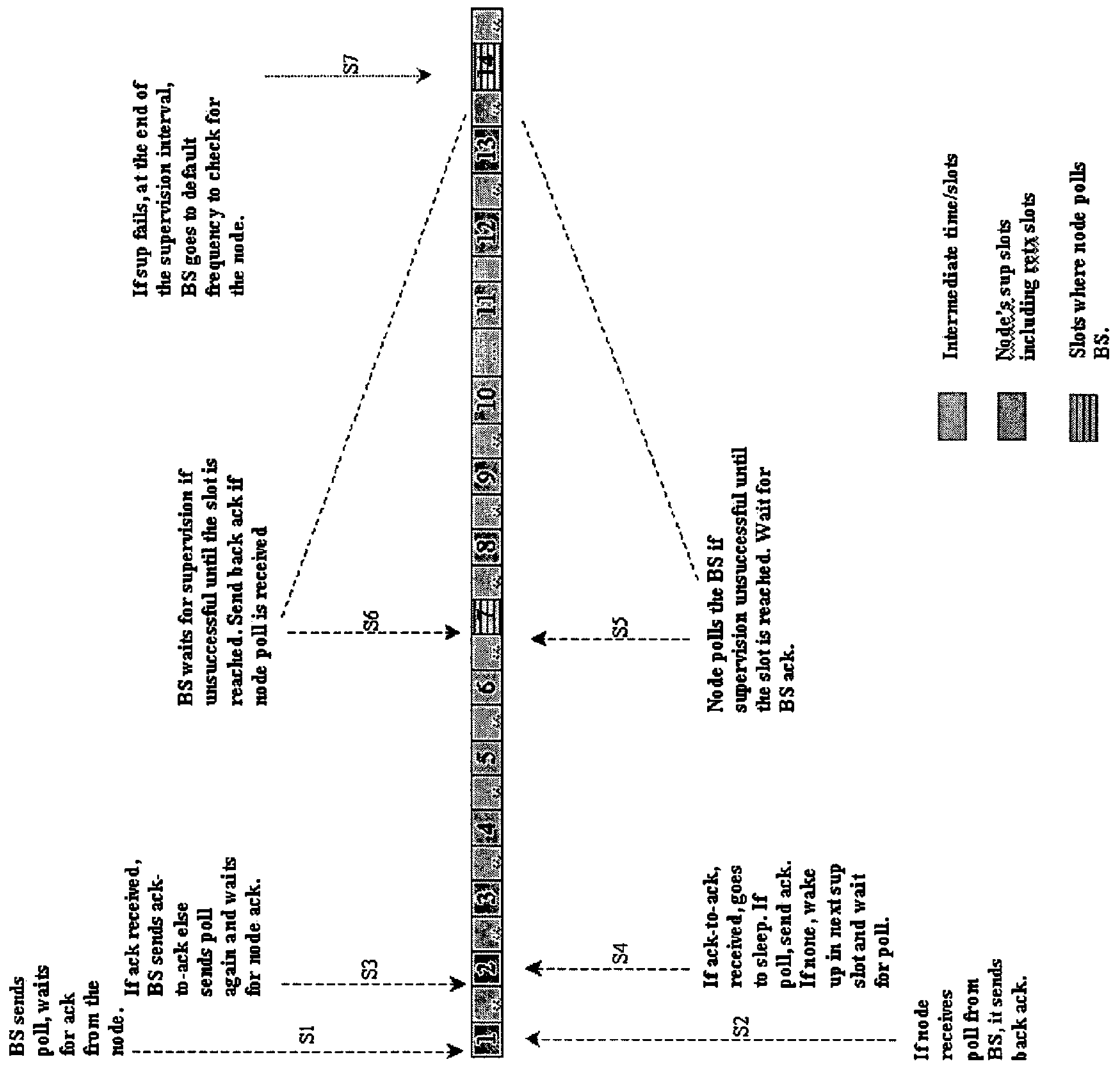
FIG. 1 shows an exemplary sequence for supervision between a transmitter and multiple receivers of a wireless communication network.

FIG. 1 shows an exemplary sequence for supervision between a transmitter and multiple receivers, in which it is assumed that the receivers are configured to be one hop from the transmitter. In this regard, the transmitter and receivers may be nodes of a wireless communication network. In particular, the transmitter may be a base station (BS) and the receivers may be sensor devices arranged to communicate with the base station (BS). In this regard, each receiver node of the wireless communication network is assigned a fixed number of time slots for supervision that should be sufficient to accommodate for retransmissions. Hence, the time slots are pre-assigned to the receiver nodes.

As indicated in FIG. 1, the time slots may include several types. For example, the type of time slot may include a supervision time slot, in which the base station (BS) and receiver nodes perform supervisory-related communication, such as, for example, the transmission of a short pulse, a poll tone, an acknowledgement to the short pulse or poll tone, or an acknowledgement to the acknowledgement to the short pulse or poll tone. The type of time slot may also include, for example, an intermittent supervision time slot, in which receiver nodes may, for example, transmit a poll tone to the base station (BS). Moreover, the type of time slot may further include, for example, intermediate time slots, in which non-supervisory related communication occurs.

According to an exemplary embodiment and/or exemplary method of the present invention, each receiver node wakes up in its respective assigned supervision time slot and waits for a poll/tone packet from the base station (BS). In this regard, the base station (BS) may use the poll/tone packet to learn if the communication link is usable and to prompt for any additional information the receiver node might have.

More specifically, in step S1, the base station (BS) sends a poll tone and waits for an acknowledgement from each of the receiver nodes. The poll tone may be sent, for example, as a broadcast message to the receiver nodes, which listen for the broadcast message.

In step S2, if a receiver node receives the poll tone, the receiver node synchronizes its local time to the local time of base station (BS) and acknowledges the poll tone. In this regard, the receiver node may set, for example, its local clock to the local clock of the base station (BS). Alternatively, the receiver node may simply acknowledge the poll time.

In step S3, if the base station (BS) receives the acknowledgement from a receiver node, the base station (BS) acknowledges the receiver node by sending its own acknowledgement in the retransmission time slot. In this regard, the acknowledgement sent by the base station (BS) may be, for example, an ack-to-ack tone. The base station (BS) may also use this packet to learn if the communication link is usable and/or to learn about any additional information the receiver node might have. If the base station (BS) does not receive the acknowledgement to the poll tone from a particular receiver node, the base station (BS) sends a poll tone again in the receiver node's next retransmission time slot, and waits for an acknowledgement from the receiver node. The ack-to-ack tone and the supervision poll may be differentiated, for example, by just one bit. In this regard, "1" may indicate, for example, a poll, and "0" may indicate, for example, an ack-to-ack tone.

In step S4, the receiver node wakes up in its next retransmission time slot to check if the base station (BS) is transmitting an ack-to-ack tone/poll. If the receiver node hears an ack-to-ack tone, the receiver node goes back to sleep, which implies that the base station (BS) received the acknowledgement that was sent by the receiver node in the prior supervision slot. If the receiver node hears a poll tone again, it acknowledges the poll tone and repeats the aforementioned procedure. If the receiver node hears no poll tone, it timeouts and wakes up in a subsequent supervision time slot to listen for a poll/ack-to-ack tone.

In step S5, every seventh slot the receiver node polls the base station (BS). If the receiver node was expecting an ack-to-ack tone in the seventh slot, it waits, timeouts and sends its information.

In step S6, if unsuccessful, the base station (BS) waits until the supervision time slot is reached. If a receiver node poll is received then the base station (BS) sends an acknowledgment to acknowledge the receipt of the receiver node's information.

In step S7, if supervision fails, at the end of the supervision interval, the base station (BS) uses a default frequency to check for the receiver node.

Figure 2:
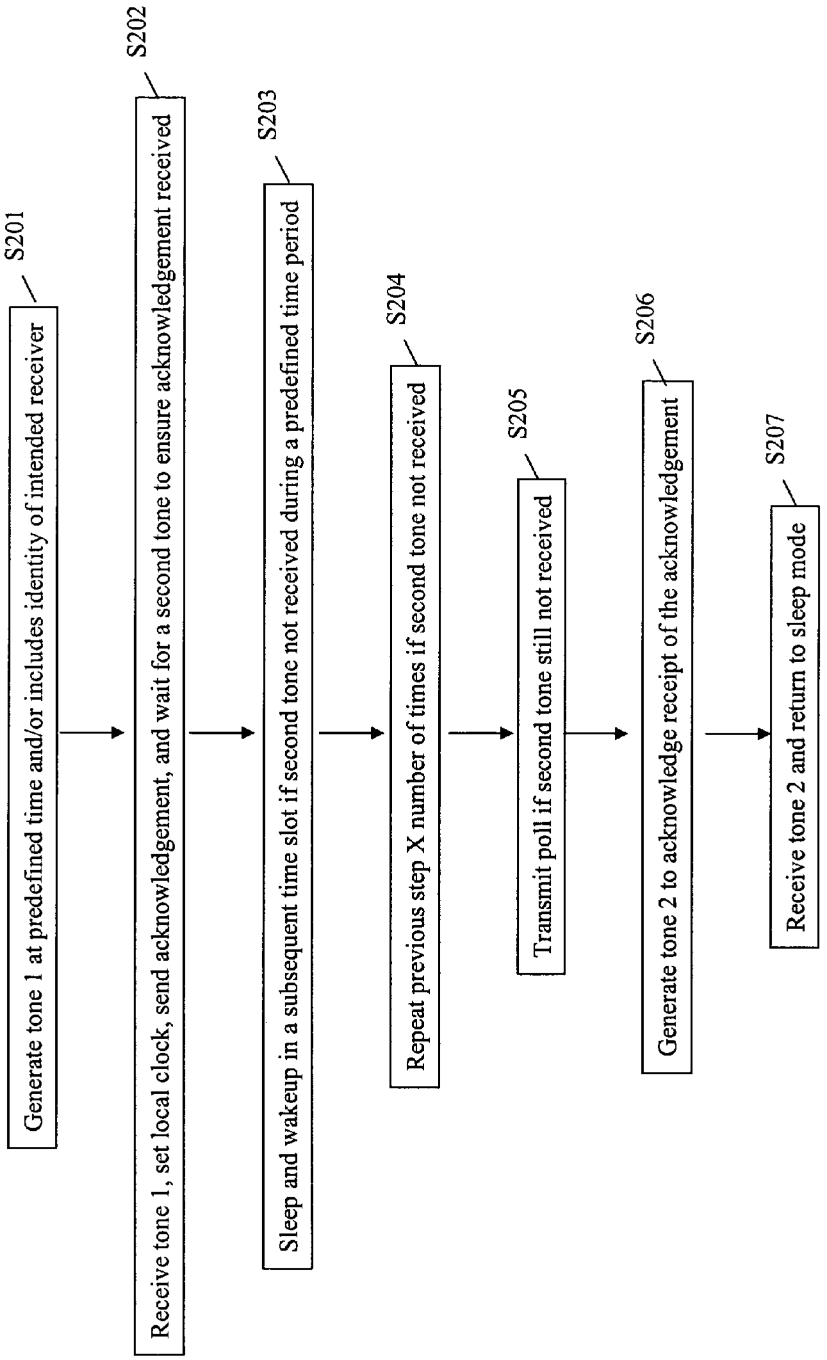
FIG. 2 shows an exemplary method for synchronizing a first device and a second device, which communicate via a time-slotted wireless communications protocol.

FIG. 2 shows an exemplary method for synchronizing a first device and a second device, which communicate, for example, via a wireless communications protocol, including, for example, a time-slotted communications protocol. The devices may be configured, for example, in a hierarchical supervisory relationship with respect to one another. In particular, the first device may be configured to supervise the second device, which may be configured to respond supervisory tones and/or acknowledgements.

In step S201, a first tone is generated by the first device at a predefined time and/or includes an identity of the second device. In this regard, the second device may be aware of the predefined time so that it may anticipate the generation of the first tone at the appropriate time and thus may optionally enter a sleep mode at other times if desired to conserve resources. Alternatively, or in addition, inclusion of the identity of the second device in the first tone may be used to distinguish the first tone as intended for the second device. Accordingly, other tones may be generated without causing an interference or confusion on the part of the second device.

In step S202, the first tone is received by the second device, which sets its local clock, sends an acknowledgement to the first device, and waits for a predefined time period for a second tone as an indication that the acknowledgement was received by the first device. In this regard, the indication may be, for example, the generation by the first device of a second tone distinguishable from the first tone.

In step S203, if the second tone is not received within the predefined time period, the second device enters the sleep mode and subsequently wakes at a later time to listen for the second tone. In this regard, the second node may wakeup, for example, in a subsequent time slot specially reserved for supervision actions.

In step S204, if upon waking up the second tone is not received by the second device, steps S202 and/or S203 are repeated. In this regard, when repeating the previous step(s) the predefined time period to wakeup and/or wait for the second tone may vary, for example, depending upon the number of times a step is repeated. In particular, the predefined time period may be increased or decreased as desired.

In step S205, if upon repeated attempts wait, sleep, and wakeup the second device still does not receive the second tone, a poll is transmitted by the second device to indicate to the first device that second tone has not yet been received by the second device. In this regard, the poll may sent asynchronously, or during a specially reserved supervisory time slot.

In step S206, the second tone is generated by the first device to acknowledge receipt of the acknowledgment sent by the second device. In this regard, the second tone may be generated, for example, at a predefined time, and may be distinguishable from the first tone via a the setting of a particular bit or bits. Alternatively, the second tone may be generated in response to the receipt of a poll from the second device.

In step S207, the second tone is received by the second device, which enters a sleep mode to conserve resources now that the synchronization between the two devices is complete. Hence, until the next supervision cycle the second device has successfully synchronized itself with the first device, and has received confirmation that the first device is aware of the successful synchronization. Accordingly, the second device may enter the sleep mode until the next supervision cycle without requiring further expenditure of resources to keep the first device informed of its synchronization status.

What is claimed is:

1. A method of synchronizing a first device and a second device, comprising:

generating a first tone by the first device, the first tone one of (a) including an identity of the second device and (b) generated at a predefined time;

receiving the first tone by the second device;

setting a clock of the second device based on the received first tone;

sending an acknowledgment by the second device to the first device;

(i) waiting for a predefined period of time by the second device for an indication of acknowledged receipt of the acknowledgement;

(ii) waking up in a subsequent supervision time slot to receive the indication of acknowledged receipt of the acknowledgement if the indication is not received within the predefined period of time;

repeating steps (i) and (ii) for a predefined number of times; and transmitting a poll by the second device to the first device if the indication of acknowledged receipt is not received.

2. The method of claim 1, further comprising:

generating a second tone by the first device for the indication of acknowledged receipt of the acknowledgement;

receiving the second tone by the second device; and entering into sleep mode by the second device.

3. The method of claim 2, wherein the first tone and the second tone are distinguishable via a single bit.

4. The method of claim 2, wherein the second device enters the sleep mode in response to receipt, by the second device, of the second tone.

5. The method of claim 1, wherein the first and second devices are wireless communication devices.

6. The method of claim 5, wherein the tone is used to ensure a connectivity status between the communication devices.

7. The method of claim 5, wherein the tone is used to supervise the second drive.

8. The method of claim 5, wherein the tone includes a short pulse.

9. The method of claim 1, wherein the tone includes the identity of the second device.

10. The method of claim 1, wherein the second device is an energy-constrained device.

11. The method of claim 1, wherein the tone is transmitted in a predefined time slot allocated for supervision.

12. The method of claim 11, further comprising:

waking up, by the second device, in the predefined time slot to receive the tone.

13. The method of claim 1, wherein the predefined time is known to the second device and wherein the clock is set based on the predefined time known to the second device.

14. The method of claim 1, further comprising:

transmitting, by the first device, another tone in a default frequency if a predefined supervision interval expires and the acknowledgement and the poll is not received.

15. The method of claim 1, further comprising:

entering into sleep mode by the second device in response to receiving, by the second device, the indication of acknowledged receipt of the acknowledgement.

* * * * *